G. H. DAVIS.
MUSIC ROLL SPOOL.
APPLICATION FILED JULY 6, 1909.

1,059,041.
Patented Apr. 15, 1913.

Witnesses.
B. W. Masters
C. V. Bowman

G. H. Davis,
Inventor
Louis M. Sanders
Atty.

UNITED STATES PATENT OFFICE.

GEORGE HOWLETT DAVIS, OF WEST ORANGE, NEW JERSEY.

MUSIC-ROLL SPOOL.

1,059,041.      Specification of Letters Patent.      Patented Apr. 15, 1913.

Application filed July 6, 1909. Serial No. 506,113.

*To all whom it may concern:*

Be it known that I, GEORGE HOWLETT DAVIS, a citizen of the United States, residing in the town of West Orange, county of Essex, and State of New Jersey, have invented certain new and useful Improvements in Music-Roll Spools; and I declare the following to be a full, clear, and exact description of the same, such as will enable others skilled in the art to which my invention appertains to make and use the same.

In the use of music rollers upon player pianos and automatic instruments, it frequently happens that the bearings of the driving shaft for rewinding the roll, and upon which one end of the spool is mounted, becomes so worn that the lateral thrust spring at the opposite end bearing will throw the spool so out of alinement, that the perforations in the roll will not properly "track" with the holes in the tracker board.

It is to obviate this difficulty and provide an adjusting device at the driving end of the spool that my present invention is directed, while at the same time produce a spool which will contain a minimum number of parts and be cheap to manufacture and readily adjustable by the simplest of operations.

In carrying out my invention I make use of the structures illustrated in the accompanying drawings in which—

Figure 1:
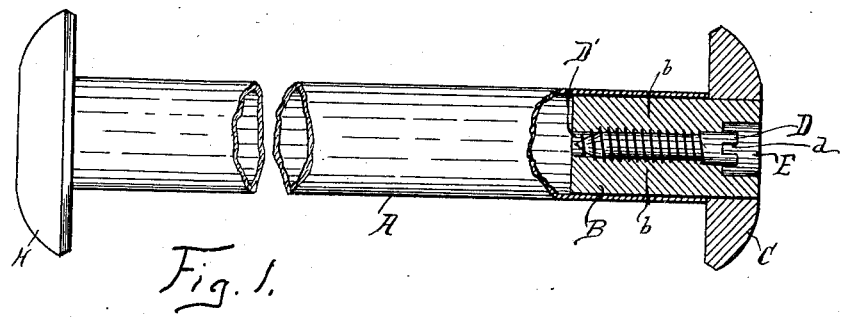
Figure 2:
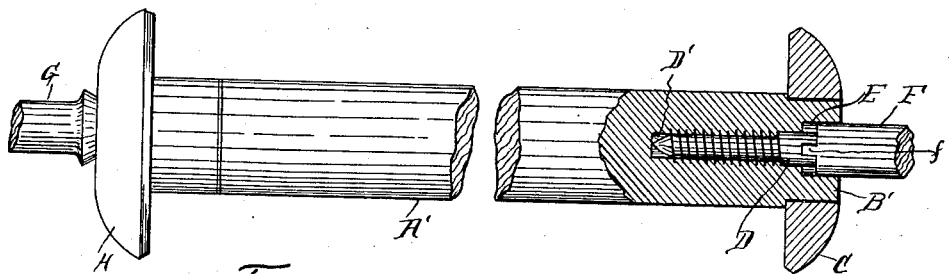

Figure 1 illustrates my adjusting device as applied to a tubular spool. Fig. 2 is a similar view showing the device as applied to a so-called solid spool.

In my application Ser. No. 494,720, I have shown a tubular spool, and in my application Ser. No. 480,307, I have shown the solid spool; in each case I have shown socket bearings for 88 note music rolls, and my present invention is an improvement upon the socket bearing at the driving end of the spool, all other parts of the spools being substantially the same as those illustrated and described in my above named applications, so that further description of the other common features is deemed unnecessary.

In Fig. 1, A is the tubular spool body having the plug B inserted in the driving end and held rigidly in position by the tacks $b$. C is the spool flange rigidly secured to the protruding end of the plug B. Extending axially through the plug B, is the threaded aperture $D^1$ terminating at its outer end in an enlarged socket E. Screwed into the aperture $D^1$ is the adjusting screw D, having its outer end located in the socket E, and provided with the slot $d$. The screw D fits very snugly in the aperture $D^1$ so that considerable force is required to screw it in or out; nevertheless it serves as an admirable means for adjusting the position of the spool longitudinally of its bearing spindles F and G. (Shown in Fig. 2.)

In Fig. 2, $A^1$ is the solid spool body carrying at its ends the flanges C and H; C, being mounted upon the reduced end $B^1$ of the spool body. The end of the body $A^1$ is provided with the aperture $D^1$ and socket E, into which is screwed the slotted screw D, in all respects like that shown in Fig. 1.

In practice the spool, whether solid or tubular, is supported upon bearing spindles F and G, F being what is known as the drive spindle and having the tang $f$ which takes into the slot $d$ while the socket E serves not only as a support for the spool, but also to center it upon the driving spindle F. In order to hold the spool in position and also to permit it to be placed in position, the spindle G is longitudinally slidable and spring actuated, while the spindle F is held firmly in its rotative position, that is against any movement in the direction of its axis. If now from constant use or any other cause, the spindle F recedes from its intended position, the spring pressed spindle G will cause the spool to follow and consequently throw the perforations out of alinement with the holes in the tracker board, or what is worse out of alinement with the flanges on the feed spool, that is, the spool which draws the roll over the tracker board. Under these conditions, it is only necessary to adjust the screw D to a position to obviate the difficulty and bring the spool back into correct position.

I claim:

1. In a music roll spool, the combination of a spool body having a cylindrical supporting and bearing socket in its end and a screw threaded aperture in the bottom of and concentric with said socket, an adjustable slotted bearing pin tightly screwed into said aperture with the outer end of said pin entirely within said socket and a flange rigidly secured upon said body.

2. In a music roll spool, the combination of a spool body having a cylindrical supporting and driving bearing socket concentrically located in the end thereof, a slotted driving pin screwed axially into said spool body with the head of said pin entirely within said socket and a flange rigidly mounted upon the end of said body.

3. In a music roll spool the combination of a spool body having a cylindrical supporting and bearing socket axially located in the end thereof, an axially adjustable driving pin located within said socket, said pin having a diametrical slot in its exposed end, whereby to both rotate said spool and to adjust said pin and a flange mounted rigidly upon said spool body.

This specification signed and witnessed this 29th day of June 1909.

GEORGE HOWLETT DAVIS.

Witnesses:
B. W. MASTERS,
C. T. BOWMAN.

Copies of this patent may be obtained for five cents each, by addressing the "Commissioner of Patents, Washington, D. C."